US011254048B2

(12) United States Patent
Lin et al.

(10) Patent No.: US 11,254,048 B2
(45) Date of Patent: Feb. 22, 2022

(54) ADDITIVE MANUFACTURING OF CONTINUOUS FIBER THERMOPLASTIC COMPOSITES

(71) Applicant: Kansas State University Research Foundation, Manhattan, KS (US)

(72) Inventors: Dong Lin, Manhattan, KS (US); Pedram Parandoush, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 143 days.

(21) Appl. No.: 16/487,622

(22) PCT Filed: Feb. 20, 2018

(86) PCT No.: PCT/US2018/018800
§ 371 (c)(1),
(2) Date: Aug. 21, 2019

(87) PCT Pub. No.: WO2018/156511
PCT Pub. Date: Aug. 30, 2018

(65) Prior Publication Data

US 2020/0061938 A1 Feb. 27, 2020

Related U.S. Application Data

(60) Provisional application No. 62/461,519, filed on Feb. 21, 2017.

(51) Int. Cl.
*B29C 64/147* (2017.01)
*B29C 64/268* (2017.01)
(Continued)

(52) U.S. Cl.
CPC .......... *B29C 64/147* (2017.08); *B29C 64/218* (2017.08); *B29C 64/268* (2017.08);
(Continued)

(58) Field of Classification Search
CPC ..... B29C 64/147; B29C 64/165; B29C 70/38; B29C 70/386; B29C 65/1619; B29C 65/74
See application file for complete search history.

(56) References Cited

U.S. PATENT DOCUMENTS 5,529,826 A * 6/1996 Tailor ........................ A61F 5/01 428/110
6,450,393 B1 * 9/2002 Doumanidis ..... B29C 66/81433 228/110.1

(Continued)

FOREIGN PATENT DOCUMENTS

WO 2015017570 2/2015

OTHER PUBLICATIONS

Grouve, W. J. B. Weld Strength of Laser-Assisted Tape-Placed Thermoplastic Composites. PhD Thesis, University of Twente, Enschede, the Netherlands. Aug. 2012. Retrieved from https://core.ac.uk/download/pdf/11484166.pdf on May 12, 2021. (Year: 2012).*

(Continued)

*Primary Examiner* — Atul P. Khare
(74) *Attorney, Agent, or Firm* — Hovey Williams LLP

(57) ABSTRACT

Additive manufacturing systems and methods used for creating 3D parts from continuous-fiber reinforced composites such as, e.g., carbon-fiber or glass-fiber pre-impregnated tape are provided. The systems and methods lay tape in successive layers and cut each layer according to a 2D slice of a 3D CAD file. During the placement of each piece of tape, a laser welds the tape to other tape, eliminating the need for post-processing of each layer. By utilizing tape instead of large fiber-reinforced sheets, the systems and methods described herein reduce waste compared to known manufacturing techniques.

14 Claims, 13 Drawing Sheets

(51) Int. Cl.

| | |
|---|---|
| ***B29C 64/218*** | (2017.01) |
| ***B29C 65/08*** | (2006.01) |
| ***B29C 70/38*** | (2006.01) |
| ***B29C 70/54*** | (2006.01) |
| ***B29C 65/00*** | (2006.01) |
| ***B29C 65/16*** | (2006.01) |
| ***B29C 65/74*** | (2006.01) |
| *B33Y 80/00* | (2015.01) |
| *B33Y 10/00* | (2015.01) |

(52) U.S. Cl.

CPC .......... *B29C 65/08* (2013.01); *B29C 65/1619* (2013.01); *B29C 65/74* (2013.01); *B29C 66/0346* (2013.01); *B29C 70/386* (2013.01); *B29C 70/545* (2013.01); *B29C 2793/0027* (2013.01); *B33Y 10/00* (2014.12); *B33Y 80/00* (2014.12)

(56) References Cited

U.S. PATENT DOCUMENTS

| | | | | |
|---|---|---|---|---|
| 8,312,827 | B1 * | 11/2012 | Free | D05C 17/00<br>112/475.08 |
| 8,632,653 | B2 * | 1/2014 | Brown | B29C 70/382<br>156/304.1 |
| 10,449,731 | B2 * | 10/2019 | Deaville | B29C 70/386 |
| 2005/0129897 | A1 * | 6/2005 | Zhou | B32B 7/12<br>428/43 |
| 2005/0130536 | A1 * | 6/2005 | Siebers | B32B 27/12<br>442/327 |
| 2005/0136772 | A1 * | 6/2005 | Chen | D04H 1/56<br>442/381 |
| 2009/0068453 | A1 * | 3/2009 | Chung | F41H 5/04<br>428/337 |
| 2013/0284347 | A1 | 10/2013 | Qi et al. | |
| 2014/0110633 | A1 * | 4/2014 | Pratte | B29C 70/386<br>252/500 |
| 2018/0229480 | A1 * | 8/2018 | Chung | B32B 27/32 |

OTHER PUBLICATIONS

Grouve et al. Weld Strength Assessment for Tape Placement. Int J Mater Form (2010) vol. 3 Suppl 1:707 710. (Year: 2010).*

Klosterman et al., "Interfacial characteristics of composites fabricated by laminated object manufacturing", Composites Part A 29A, 1165-1174, 1998. (Year: 1998).*

Flach et al., "A Thermal Model for Laminated Object Manufacturing (LOM)", The 8th Solid Freeform Fabrication Sym., University of Texas, Austin, USA, 1997. (Year: 1997).*

International Search Report and Written Opinion in corresponding PCT Application Serial No. PCT/US2018/018800, dated May 2, 2018.

Maurer, et al., "Laser-powered tape placement process—simulation and optimization", Adv Man: Polymer & Composites Sci, 2015, vol. 1, issue 3, 129-137.

Parandoush, et al., "Laser assisted additive manufacturing of continuous fiber reinforced thermoplastic composites", Materials & Design, vol. 131, Oct. 5, 2017, 186-195.

Sabah, et al., "Welding of thermoplastic materials using CO2 laser", Diyala J Eng Sci, vol. 5, issue 1, Jun. 2012, 40-51.

* cited by examiner

ADDITIVE MANUFACTURING OF CONTINUOUS FIBER THERMOPLASTIC COMPOSITES

CROSS-REFERENCE TO RELATED APPLICATIONS

The present application is the U.S. National Stage of International Patent Application No. PCT/US2018/018800, filed Feb. 20, 2018, which claims the priority benefit of U.S. Provisional Patent Application Ser. No. 62/451,519, filed Feb. 21, 2017, entitled ADDITIVE MANUFACTURING OF CONTINUOUS FIBER THERMOPLASTIC COMPOSITES, each of which is incorporated by reference in its entirety herein.

TECHNICAL FIELD

The field of the invention relates to additive manufacturing of fiber-reinforced composites. More particularly, aspects of the invention relate to additive manufacturing using carbon or glass fiber tape or pre-impregnated composites.

BACKGROUND OF THE INVENTION

Additive manufacturing processes have rapidly gained in popularity due to the unique ability to quickly create customizable, application-oriented parts. For example, fused deposition modeling (FDM), also known as 3D printing method, allows a user to rapidly manufacture a customized part by extruding a thermoplastic material layer by layer until the ultimate 3D part is formed. FDM, however, has limited application for fiber-reinforced composites, because the fibers present in the filament necessitate a high-extrusion force and can lead to accelerated tool wear. Moreover, the mechanical properties of the printed part are inferior as compared to traditional continuous-fiber composite manufacturing techniques because most fibers used in the FDM are shorter than those used for, e.g., compression molding or other known manufacturing techniques, and because the extruded filament results in voids between the beads deposited during printing, significantly decreasing the strength of parts compared to traditional techniques.

Accordingly, some additive manufacturing methods employ a process known as laminated object manufacturing (LOM). In LOM processes, multiple sheets of, e.g., continuous-fiber reinforced composites are stacked on top of one another, and a hot roller is passed over the sheets causing them to heat and ultimately bond (laminate) to one another. After the resin has cured, a 3D part is cut from the stack. LOM thus requires lengthy post-processing and is significantly slower and more process-intensive than FDM. Moreover, LOM requires the use of large sheets of material, resulting in significant waste once the 3D part is cut from the stack.

Notwithstanding the current difficulty of creating rapid, customizable parts formed from continuous-fiber reinforced composites, such parts remain in high demand for many applications because the resulting parts are lightweight and relatively strong. There thus remains a need for an additive manufacturing process suitable for manufacturing customizable, 3D parts from continuous-fiber reinforced materials, but which results in parts exhibiting mechanical properties comparable to or exceeding traditional manufacturing techniques.

SUMMARY

Aspects of the invention generally relate to additive manufacturing systems and methods for creating 3D parts from continuous-fiber reinforced composites such as, e.g., carbon-fiber or glass-fiber pre-impregnated tape (“prepreg” or “tape”). The systems and methods lay tape in successive layers and cut each layer according to a 2D slice of a 3D CAD file or the like. Each placed tape is welded to another already laid tape, eliminating the need for post-processing via a hot roller or similar device. Moreover, because in some embodiments the systems and methods utilize fiber-reinforced tape instead of, e.g., fiber-reinforced sheets used in LOM processes, the systems and methods described herein ultimately result in reduced waste material compared to known processes. The systems and methods can vary the orientation of fibers layer by layer, thus providing improved strength over composites that include only unidirectional fibers. And the systems and methods can use multiple different materials layer by layer, or even intra-layer, to achieve desired composite properties.

More particularly, some aspects of the invention are directed to an additive manufacturing method for constructing a three-dimensional part out of a continuous-fiber reinforced tape. The method includes forming a laminate structure comprising a first segment of continuous-fiber reinforced tape welded to at least one other segment of continuous-fiber reinforced tape, wherein each of the segments of continuous-fiber reinforced tape comprises a fiber and thermoplastic material composite, and wherein each of the segments of continuous-fiber reinforced tape includes two opposed major faces and two opposed minor faces, each of the minor faces extending between the two opposed major faces. Welding the first segment of continuous-fiber reinforced tape to the at least one other segment of continuous-fiber reinforced tape includes causing the thermoplastic material of a first major face of the first segment of continuous-fiber reinforced tape to heat and intermix with the thermoplastic material of a first major face of each of the at least one other continuous-fiber reinforced tapes so as to form a bond between the first segment of continuous-fiber reinforced tape and the at least one other segment of continuous-fiber reinforced tape that occupies at least a majority of the first major face of the first segment of continuous-fiber reinforced tape thereby forming the laminate structure. The resulting laminate structure has a tensile strength that is at least a great as each of the segments of continuous-fiber reinforced tape.

Other aspects of the invention are directed to a three-dimensional, continuous-fiber reinforced composite part produced from, e.g., the above-described method. The composite part includes a laminate structure made of a plurality of segments of continuous-fiber reinforced tapes, with each including a fiber and thermoplastic material composite, and two opposed major faces and two opposed minor faces, each of the minor faces extending between the two opposed major faces. A first segment of continuous-fiber reinforced tape is welded to at least one other segment of continuous-fiber reinforced tape so that the thermoplastic material of a first major face of the first segment of continuous-fiber reinforced tape is intermixed with the thermoplastic material of a first major face of each of the at least one other continuous-fiber reinforced tapes so as to form a bond between the first segment of continuous-fiber reinforced tape and the at least one other segment of continuous-fiber reinforced tape that occupies at least a majority of the first major face of the first segment of continuous-fiber reinforced tape. The laminate structure has a tensile strength that is at least a great as each of the segments of continuous-fiber reinforced tape.

These and other aspects will become more apparent with reference to the attached drawing figures in light of the detailed description below.

BRIEF DESCRIPTION OF THE DRAWINGS

The present invention is described in detail below with reference to the attached drawing figures, wherein.

DETAILED DESCRIPTION

At a high level, aspects of the invention generally relate to additive manufacturing systems and methods and the products created thereby. The additive manufacturing systems and methods generally use continuous-fiber reinforced composites in the form of a tape and/or a pre-impregnated ("prepreg") composite, collectively and individually referred to herein as "tape" for simplicity. The systems and methods add tapes in successive layers using a laser welding process and cut each layer according to a computer-aided design (CAD) file. More particularly, a desired 3D shape defined by the CAD file is "sliced" into a plurality of 2D layers, and each layer is laser cut accordingly to a corresponding 2D slice. This process is iterated layer by layer until an ultimate laminate structure in the 3D shape defined by the CAD file is achieved.

Figure 1:
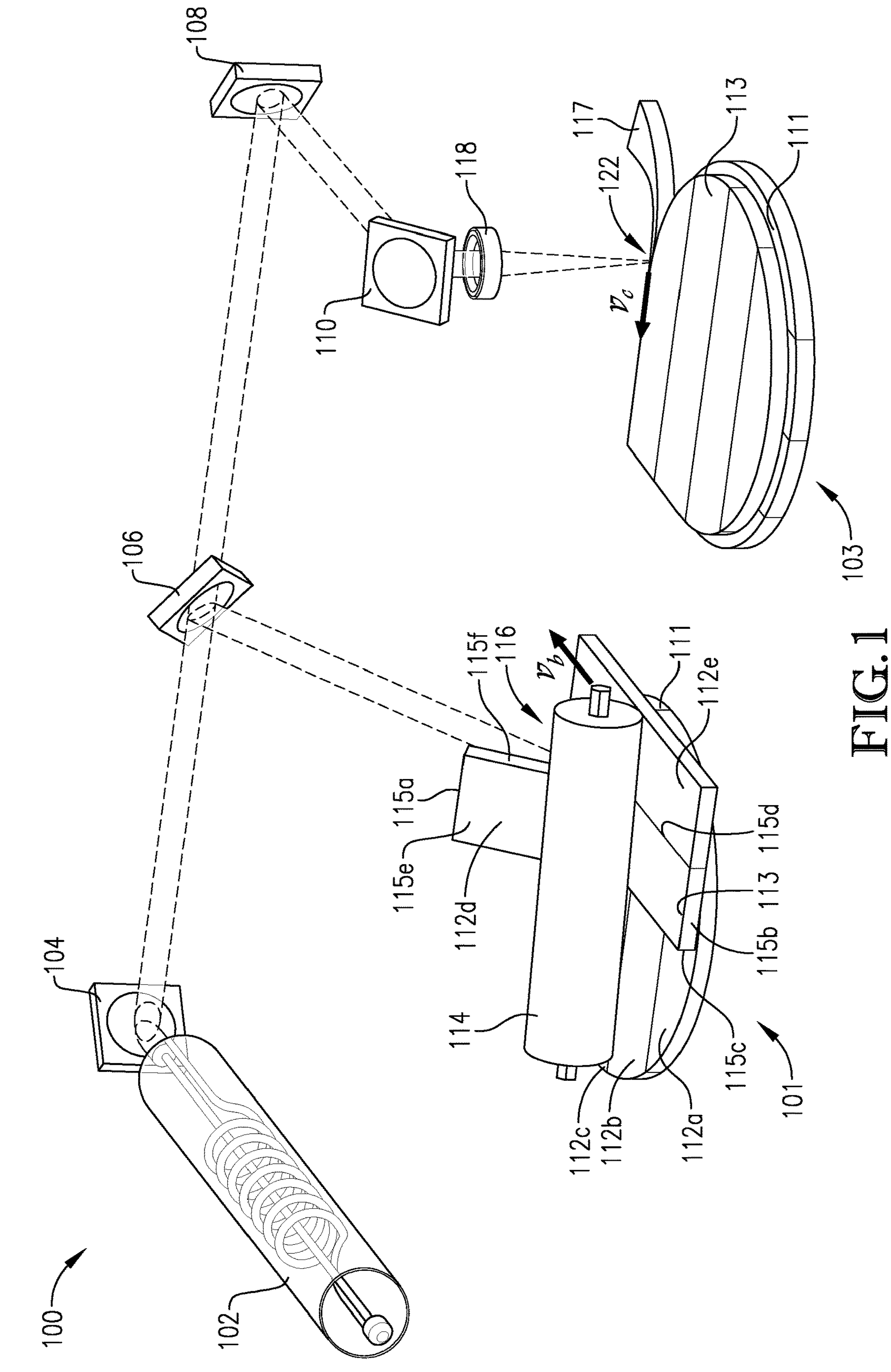
FIG. 1 is a schematic of an additive manufacturing system according to one aspect of the invention.

This may be more readily understood with reference to the figures. FIG. 1 is a schematic of an additive manufacturing system 100 according to one aspect of the invention. The additive manufacturing system 100 generally includes a laser 102, a series of mirrors 104, 106, 108, and 110, a compaction roller 114, and a lens 108. The laser 102 may be any suitable laser used for laser welding and/or laser cutting, in some embodiments, may be a carbon dioxide ($CO_2$) laser such as a 100 W $CO_2$ laser commercially available from Beijing Reci Laser Technology Co., Ltd. It is appreciated that "100 W" refers to the maximum power of the laser, and not necessarily a power used during the processes described herein. For example, and as will be discussed in more detail, during use the laser may be operated between 20 W and 35 W, and, in some embodiments, may be operated at 22 W, 24 W, 26 W, 28 W, or 29 W. In other embodiments, the laser may be, e.g., a near infra-red (NIR) diode laser or the like.

One or more components of the additive manufacturing apparatus 100 may be movable to assist with a laser-assisted tape placement step 101 and/or laser cutting step 103, discussed in more detail below. For example, a work surface supporting the layers of tape may be movable during either the laser-assisted tape placement step 101 or the laser cutting step 103, with other components (such as the laser 102, mirrors 106, 108, and 110, and the compaction roller 114) remaining stationary. Additionally or alternatively, the mirrors 106, 108, and/or 110 may be movable to direct the laser to a precise location during either the laser-assisted tape placement step 101 or the laser cutting step 103, and the compaction roller 114 may be movable (i.e., rollable) in a direction depicted by the arrow $v_b$ in FIG. 1 to apply a constant pressure to a segment of tape 112 being laid during an additive manufacturing process. That is, the compaction roller 114 may roll at an angular velocity sufficient to result in lateral movement of the roller at a predetermined binding velocity, $v_b$.

The additive manufacturing apparatus generally forms a 3D object layer-by-layer using the tape 112. As labeled on tape 112*d*, each piece of tape generally includes two end faces 115*a* and 115*b* with two opposed major faces 115*e* and 115*f* and two opposed minor faces 115*c* and 115*d* extending therebetween. Each of the minor faces 115*c* and 115*d* also extend between the two opposed major surfaces 115*e* and 115*f*. Put another way, the tape 112 has a thickness and a width, the width being greater than the thickness with the minor faces 115*c* and 115*d* representing the thickness and the major faces 115*e* and 115*f* representing the width. Although in FIG. 1 the tape 112*d* is depicted as having a narrower width than length (i.e., a dimension extending from end face 115*a* to end face 115*b*), the invention is not so limited. For example, in other embodiments, the width of the tape 112 may approach, equal, or even exceed the length of tape 112, resembling, e.g., a sheet-like structure without departing from the scope of this disclosure.

The apparatus first forms a base layer 111 out of one or more segments of tape 112 (i.e., visible tapes 112*a-c* in FIG. 1, among others). As will be discussed in more detail with reference to the top layer 113, below, the base layer 111 is generally formed first by laser welding the plurality of tapes 112*a-c* together, and then by laser cutting a 2D slide of a 3D CAD drawings into the layer 111. Once base layer 111 is cut, the additive manufacturing apparatus moves on to a second layer (and subsequent layers, if necessary), which will be described in more detail. Alternatively, a sheet of prepreg (rather than multiple segments of tape 112) may be used as the base layer 111.

To form the next layer 113, segments of tape 112 are laid one-by-one and laser welded to each other and/or the base layer 111. For example, in a first step of layer formation (i.e., the laser-assisted tape placement step 101), the segments of tape 112*d* and 112*e* are laid on top of a base layer 111 formed by a plurality of welded tapes 112*a*, 112*b*, and 112*c* (or a single sheet of prepreg or the like, not shown). The tapes 112 may be any suitable continuous-fiber-reinforced composite or prepreg. The tapes 112 may generally include a fiber and thermoplastic material composite. For example, in some embodiments, the tapes 112 may include glass or carbon fibers suspended in a thermoplastic resin such as polypropylene, polyethylene, or polyethylene terephthalate (PET). In some embodiments, tapes 112 are unidirectional glass fiber/prepreg having 68% fiber and commercially available from Polystrand® under the name IE 6832, and in some embodiments are bidirectional glass fiber/prepreg having 60% fiber and commercially available from Polystrand® under the name IE 6010. Moreover, the tapes 112 may have a thickness in the range of 0.1 mm to 1.0 mm, and in some embodiments may be 0.130, 0.3 mm, or 0.33 mm thick, and may have a width in the range of 1 mm to 10 mm, and in some embodiments may be 5 mm wide.

In the depicted embodiment, the tapes 112*d*, and 112*e* are laid generally perpendicular with respect to an orientation of each of the tapes 112*a*, 112*b*, and 112*c* forming the base layer 111. In this regard, the ultimate composites exhibit greater strength than composites having fibers only unidirectional fibers. In other embodiments, the tapes 112*d*, 112*e* may be laid generally parallel to or at an oblique angle with respect to the tapes 112*a*, 112*b*, 112*c* forming the base layer 111 without departing from the scope of the invention. For example, in some embodiments the fibers in each successive layer may be laid at a +/−45 degree angle with respect to the previous layer. And as will be more apparent with discussion of the laser cutting step 103 below, the tapes 112*d*, 112*e* may overhang the base layer 111. That is, the process "slices" up the 3D CAD shape into a series of 2D layers. Then, after each layer is formed in the laser-assisted tape placement step 111, the process cuts the layer (or slice) according to the CAD file before moving to the next layer. In that regard, as seen in FIG. 1, the base layer 111 has already been laser cut to include a rounded edge, and thus portions of the tapes 112*d* and 112*e* laid on top of the base layer 111, which form a top layer 113, overhang the finished edge of base layer 111.

As each tape 112 is laid, the laser 102 is directed to a welding interface 116 of at least two of the segments of tape 112 using one or more of the mirrors. For example, in the depicted embodiment tape 112*d* is currently being laid such that at least part of the major face 115*f* of the tape 112*d* is in contact with at least part of the first layer 111, and such that at least part of the minor face 115*d* of the tape 112*d* is in contact with at least part of one of the minor faces of tape 112*e*. Accordingly, the laser 102 is directed to an interface 116 of tape 112*d* with tape 112*c* and/or tape 112*e* using two mirrors 104 and 106 in order to weld the tape 112*d* to the abutting tapes and/or layers. More particularly, the laser causes the thermoplastic material of the major face 115*f* of the tape 112*d* to heat—in some embodiments, to a temperature above the thermoplastic's glass transition temperature ($T_g$) but below the melting point ($T_m$)—and intermix with the thermoplastic material of an upward facing major face of each of tapes 112*a-c* forming the base layer 111 so as to form a bond between the tape 112*d* and the base layer 111 that occupies at least a majority of the major face 115*f* of the tape 112*d*. Additionally or alternatively, the laser causes the thermoplastic material of the minor face 115*d* of the tape 112*d* to heat—in some embodiments, to a temperature above the thermoplastic's glass transition temperature ($T_g$) but below the melting point ($T_m$)—and intermix with the thermoplastic material of the abutting minor face of tape 112*e* so as to form a bond between the tape 112*d* and tape 112*e* that occupies at least a majority of the minor face 115*d*.

In some embodiments, a work surface supporting the layered tape 112 may be movable such that the laser 102 is directed to a precise interface 116 of tape 112*d* with the base layer 111 and/or any tape layers abutting the tape 112*d* (such as, e.g., tape 112*e*) during the additive manufacturing process. More particularly, as tape 112*d* is laid generally perpendicular to the base layer 111, workspace continually moves the layered tape 112 to direct the laser 102 to the welding interface 116 during the additive manufacturing process. In other embodiments, at least one of the mirrors may be movable to assist in directing the laser to the welding interface 116. The laser 102 may hit the welding interface 116 at an angle of 0 to 90 degrees with respect to the base layer 111, and more particularly 10 to 30 degrees, and in some embodiments may be 18 degrees.

Again, by directing the laser 102 at the welding interface 116, the pieces of tape 112 are heated and welded together. For example, in embodiments where the tape 112 is prepreg, focusing the laser 102 at the welding interface 116 may cause the resin in the prepreg to heat and intermix, forming a bond between the base layer 111 and the top layer 113, and more particularly, between tapes 112*d*, 112*c*, and/or 112*e*. Moreover, pressure is applied to the layers 111 and 113 via the compaction roller 114. That is, in embodiments where there work surface supporting the layered tape 112 is movable, the work surface moves the layered tape 112 such that the weld is driven under the compaction roller 114 so that the roller passes across the tape 112 at a predetermined binding velocity, $v_b$. In some embodiments, this velocity may be between 1 and 10 mm/s, and, more particularly, may be about 2 mm/s. In other embodiments, the compaction roller 114 itself may be movable and may generally move in the same direction as a direction in which the tape 112*d* is being laid, and at the predetermined binding velocity, $v_b$. In these embodiments, the compaction roller 114 rolls with an angular velocity sufficient to move the roller in the lateral direction at a binding velocity $v_b$. The pressure applied by compaction roller 114 further assists with the curing process of the thermoplastic resin contained in the, e.g., prepreg or other continuous-fiber reinforced composite.

Although not shown, in other embodiments the tapes may be bonded to one another using other methods. For example, the tapes may be bonded at step 101 by ultrasonic welding.

Although only five segments of tape 112 and two layers 111, 113 are depicted in laser-assisted tape placement step 101 of FIG. 1, it should be appreciated that in practice more or fewer segments of tape 112 and layers may be used to meet the required dimensions of the 3D part being machined. For example, in some embodiments each layer may be formed using a single sheet of prepreg or the like. For each subsequently laid segment of tape 112, the above-described process generally repeats. That is, the next segment of tape 112 is laid next to a previously laid tape 112 (if any), and is welded to the already laid tape 112 and a layer immediately below (if any) using laser welding and pressure from the compaction roller 114.

Once an entire layer (in the depicted embodiment in FIG. 1, top layer 113) is formed, the additive manufacturing apparatus 100 machines the layer 113 at laser cutting step 103. The laser cutting step 103 uses a focused laser to laser cut the layer 113 into a 2D slice forming part of the ultimate 3D part. In the depicted embodiment, the laser cutting step 103 employs the same laser 102 used during the laser-assisted tape placement step 101. But in other embodiments, a different laser may be used at step 103 than is used at step 101.

The laser 102 is directed to a cutting interface 122 via mirrors 108 and 110 and precisely focused at the cutting interface 122 via lens 118. As discussed in connection with the laser assisted tape placement step 101, the workspace supporting the layered tape 112 may be movable during the laser cutting step 103, and/or the laser 102 itself may be movable during the laser cutting step 103 via, e.g., one or more movable mirrors 104, 106, 108, and 110. In some embodiments, the laser is focused to a spot diameter between 0.1 mm and 5 mm, and more particularly 0.5 mm to 1.5 mm, and in some embodiments to a spot diameter of 1.0 mm. The laser 102 may be operated during the laser cutting step 103 at a power between 20 W and 50 W and, more particularly, at about 35 W, and is moved at a cutting velocity $v_c$ such that the spot diameter general follows the 2D slice of the 3D CAD design. In some embodiments, the predetermined cutting velocity may be between 1 and 150 mm/s, and, in some embodiments, may be about 70 mm/s. At this step, the laser 102 is used to trim excess tape 117 off the edges of the layer 113, such that the resulting layer 113 is in the desired 2D shape (in the depicted embodiment, a generally circular shape). In other embodiments, other types of laser such as, e.g., Nd:YAG (neodymium-doped yttrium aluminum garnet; $Nd{:}Y_3Al_5O_{12}$) may be used for cutting the 2D slices. Although not shown, in other embodiments other cutting means may be employed such as, e.g., one or more blades, a mill, and/or water jetting.

Figure 3B:
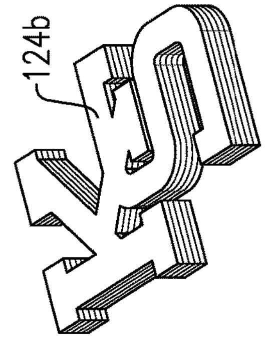
FIGS. 3*a* and 3*b* shows 3D parts formed by the additive manufacturing system shown in FIG. 1 or FIG. 2.
Figure 3A:
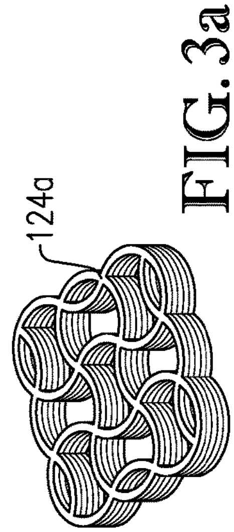

Once the layer 113 is cut into the desired 2D shape, the process returns to the laser-assisted tape placement step 101 (if necessary) and ultimately the laser cutting step 103 for each subsequent layer, or slice, of the 3D part. For example, as seen in FIGS. 3*a* and 3*b*, in the depicted embodiment the additive manufacturing apparatus 100 is used to cut a first 3D part 124*a*, resembling a plurality of interlocking wavy lines, and a second 3D part 124*b*, resembling an interlocking K and S. For the first 3D part 124*a*, steps 101 and 103 are repeated four times to form the four 2D layers comprising the ultimate 3D shape. For the second 3D part 124*b*, steps 101 and 103 are repeated seven times. That is, the final 3D parts 124*a* and 124*b* include multiple laser-welded and cut tape layers stacked on top of one another forming the desired 3D shape.

The tapes 112 used at each step of the additive manufacturing process need not be a common material. That is, the material used may vary layer by layer—i.e., such that the tape 112 used to form the base layer 111 may be different from those used to form the next layer 113—or even vary within each layer—i.e., tape 112*d* may be a different material than tape 112*e*. In this regard, the additive manufacturing process provides the unique ability to mix materials when forming the 3D parts.

Figure 2:
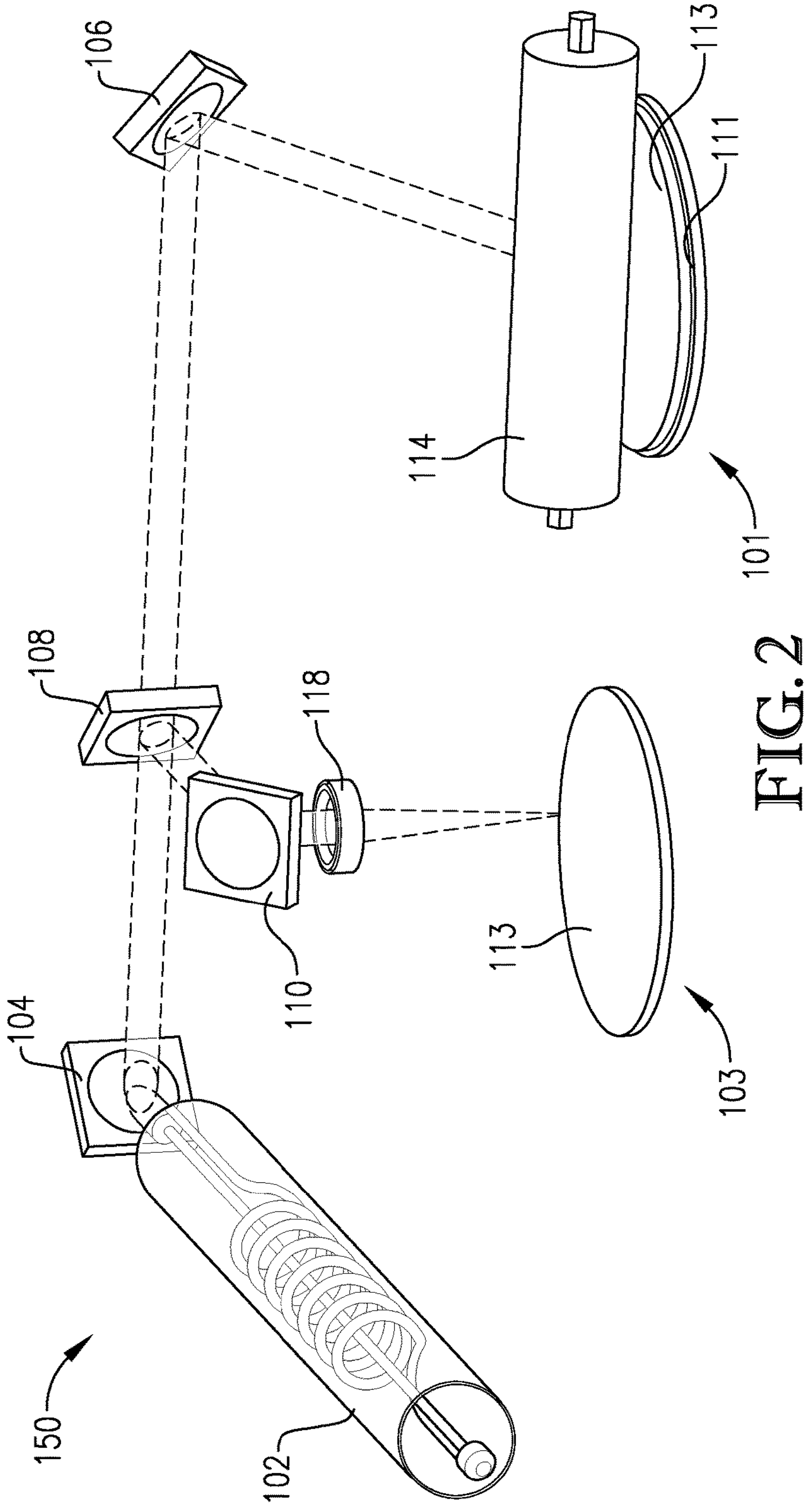
FIG. 2 is a schematic of another embodiment of an additive manufacturing system according to one aspect of the invention.

Although in the embodiment depicted in FIG. 1 the laser-assisted tape placement step 101 is performed before the laser cutting step 103, in other embodiments these and other steps of the methods described herein may be performed in a different order. That is, many different arrangements of the various components depicted, as well as components not shown, are possible without departing from the spirit and scope of the present invention. For example, FIG. 2 depicts an additive manufacturing system 150 according to another aspect of the invention. The additive manufacturing system 150 includes the same general components as described above in connection with the additive manufacturing system 100 depicted in FIG. 1, and thus will not be described in detail here. However, in this embodiment, each layer is laser cut before being welded to another layer. Namely, the layer 113 is cut at the laser cutting step 103 before that cut layer is then welded to the base layer 111 at the laser-assisted tape placement step 101. Moreover, and as illustrated in FIG. 2, in some embodiments, each layer may be formed from a single sheet of prepreg, which is laser cut before being laser welded to the layer directly below it (if any).

Figure 4:
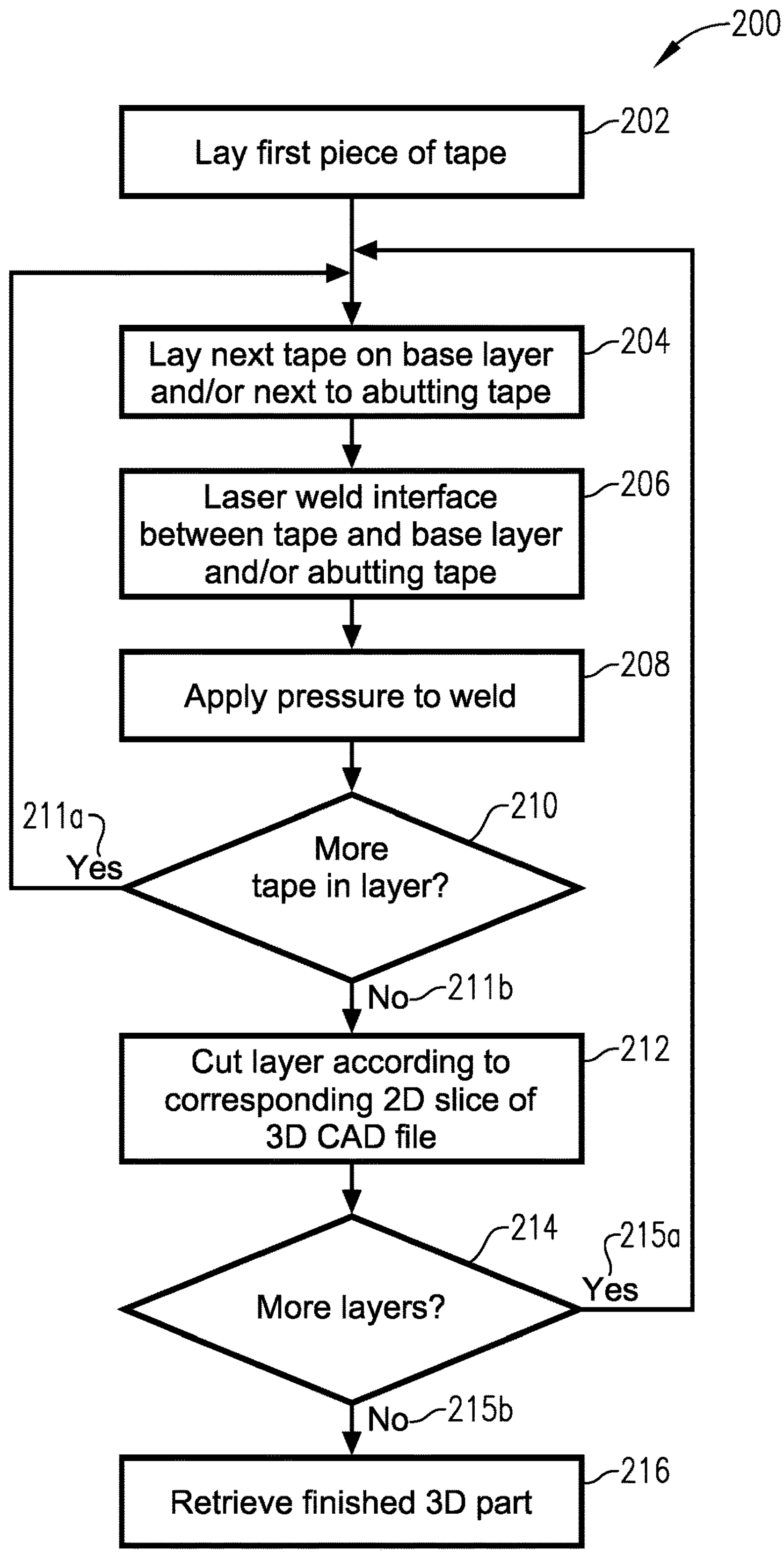
FIG. 4 is a flowchart of an embodiment of additive manufacturing process implemented by the additive manufacturing system depicted in FIG. 1.

Turning now to FIG. 4, a flowchart 200 depicting an additive manufacturing process according to one aspect of the invention is depicted. The process starts at step 202, where a first segment of tape of a first layer of a 3D part is laid. Because at step 202 no other tape has yet been laid, the first piece of tape need not be laser welded to anything. For example, with respect to the embodiment depicted in FIG. 1, when tape 112*a* is laid, there may be no adjoining tape and no previously laid layer. In that regard, the process proceeds to step 204 without employing the laser or the compaction roller.

At step 204, a second (or subsequent, as will be explained) segment of tape is laid. If the tape forms part of the bottom layer of the 3D part, the tape will be laid such that it abuts the already laid tape, but no other tape layers (i.e., such that at least part of the minor faces of the two pieces of tape are in contact). For example, with respect to the embodiment depicted in FIG. 1, when tape 112*b* is laid it will abut tape 112*a*, and when tape 112*c* is laid it, in turn, abuts tape 112*b*. While the tape is being laid, its minor face is welded to the minor face of any adjoining tapes at steps 206 and 208 via a laser and a compaction roller. More particularly, the laser is focused at a welding interface between the tape being laid and any adjoining tapes at step 206, heating and intermixing the thermoplastic resin in each abutting tape. Next, a compaction roller applies pressure to the weld at step 208, further curing the welds. As described in connection with FIG. 1, the compaction roller 114 applies a constant pressure to the tape being laid while rolling such that it moves at a predetermined lateral binding velocity, $v_b$. Again, in some embodiments, a single sheet of prepreg or the like (rather than multiple segments of tape 112) may form the entire base layer.

The tapes may alternatively be bonded at steps 206 and/or 208 by, e.g., ultrasonic welding or other bonding processes.

Once the entire length of the tape is laid, the process at step 210 determines if more tape is needed to complete the layer. For example, returning the embodiment depicted in FIG. 1, once tape 112*b* is laid, the process would determine at step 210 that yes (211*a*) more tape is needed to complete the layer (i.e., at least tape 112*c*), but once 112*c* or subsequent tape is laid, the process may determine at step 210 that no (211*b*) more tape is not needed to complete the layer. If yes (211*a*), the process returns to step 204, and the process repeats steps 204-208 for the next segment of tape in the layer. Once the process determines no more tape is needed to complete a layer (211*b*), the process proceeds to step 212.

At step 212, the completed layer is cut according to a corresponding 2D "slice" of the 3D CAD file. Returning to the example discussed in connection with FIG. 1, using, e.g., mirrors 104, 108, and 110 and lens 118, the laser is focused at a cutting interface 122 and moved at a cutting velocity $v_c$ following the general outline of the corresponding 2D slice. Again, the laser used at step 212 may be the same laser used in step 206, or may be a separate laser dedicated for use in the laser cutting step. And in some embodiments, a work surface supporting the layer may be movable instead of or in addition to the laser during the laser cutting step 212.

Again, the layers may alternatively be cut at steps 212 by other cutting means including, e.g., one or more blades, a mill, a water jet, or the like. Moreover, and as discussed in connection with FIG. 2, the layers may be cut prior to being welded to other layers. That is, the cutting step 212 may be performed prior to the tape placement steps 204-208 with departing from the scope of this invention.

Once the entire 2D slice is laser cut from the tape layer, the process proceeds to step 214. At step 214, if more layers are to be included to form the 3D part (215*a*), the process returns to step 204, and repeats steps 204-212 for the next layer. For example, and again returning to the example depicted in FIG. 1, once the base layer 111 is laser cut into a circular shape, the process constructs the next layer 113. Namely, the process lays tape 112*e* and laser welds that tape 112*e* to the base layer 111 (i.e. lays the tape 112*e* such that at least part of one of its major faces is in contact with the base layer 111, and uses the laser to heat—in some embodiments, to a temperature above the thermoplastic's glass transition temperature ($T_g$) but below the melting point ($T_m$)—and intermix the thermoplastic resin of the tape 112*e* with the thermoplastic resin of the base layer 111), and then lays tape 112*d* laser welding it to both tape 112*e* and the base layer 113, repeating with as much tape as is necessary until the layer 113 is fully formed. Once enough tape has been laid (211*b*), the process proceeds to step 212 and laser cuts the layer 113 according to the corresponding 2D slice of the 3D CAD file.

As should be appreciated, the process continues until all necessary layers have been laid, laser welded, and laser cut, forming the final 3D part. For example, with respect to part 124*a* shown in FIG. 3*a*, the process iterates through steps 204-212 four times, forming a stack of four layers of plurality of interlocking wavy lines. For part 124*b* shown in FIG. 3*b*, the process iterates through steps 204-212 seven times, forming a stack of seven layers of the interlocking K and S. Once the process has laid and cut all necessary layers (215*b*), the finished 3D part can be retrieved at step 216.

The resulting 3D part constructed using the above-described systems and processes have increased strength compared to, e.g., 3D parts constructed using a FDM process. Moreover, because the additive manufacturing medium (i.e., tape or prepreg) isn't extruded as in an FDM process, the above-described additive manufacturing systems and processes reduce the amount of tool wear as compared to FDM processes. Still more, because the tape is laser welded during the laser-assisted tape placement step 101, the tape 112 requires no post-placement processing (such as, e.g., the use of a hot roller required in LOM methods, or otherwise), and in some embodiments the systems and processes described herein reduce waste by utilizing tape rather than large sheets of material. Thus, the described additive manufacturing system and process are uniquely suited to provide high-precision customized fiber-reinforced composite parts.

Figure 5:
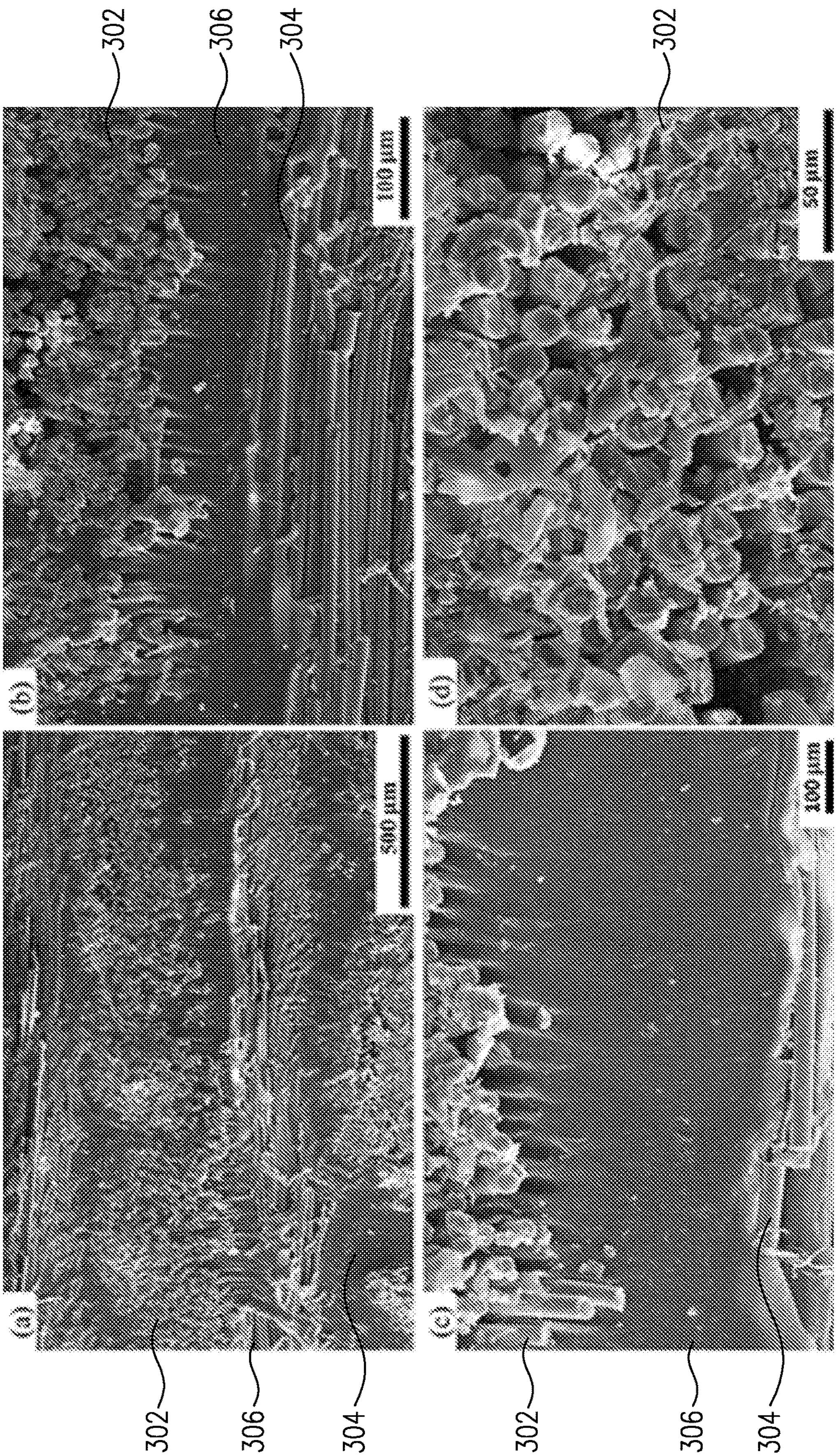
FIG. 5 depicts scanning electron microscope (SEM) images of cross-sections of 3D parts formed by the system depicted in FIG. 1 or 2 and/or the process depicted in FIG. 4.

This may be more readily understood with reference to FIGS. 3-11. First, FIG. 5 shows scanning electron microscope (SEM) images of a cross-section of a 3D part formed using the above-described system and/or process. More particularly, FIG. 5 shows SEM images of a cross-section of a 3D part formed using unidirectional glass fiber/prepreg such as, e.g., IE 6832 commercially available from Polystrand®. As best seen in FIGS. 5(*a*) and 3(*b*), the tapes in each layer were laid at a substantially 90-degree angle with respect to the abutting layers. More particularly, the fibers in the layer 302 generally are arranged in a direction extending into/out of the image, and the fibers in layer 304 generally are arranged in a direction extending left to right. Put another way, the tapes are arranged such that a longest dimension of the fibers within the layer 302 are substantially perpendicular to a longest dimension of the fibers within layer 304. In that regard, the composite exhibits superior strength characteristics as compared to composites containing only unidirectional fibers.

The resulting interfacial bond 306 between the two layers 302, 304 includes no visible void or gaps between the tapes unlike fiber-reinforced parts formed by FDM. And as best seen in layer 304 depicted in FIGS. 3(*a*)-3(*c*), the fibers in each layer are continuous, resulting in superior stiffness compared to other additive manufacturing methods, which must, e.g., use shortened fibers in order to extrude a filament during the FDM process.

Figure 6:
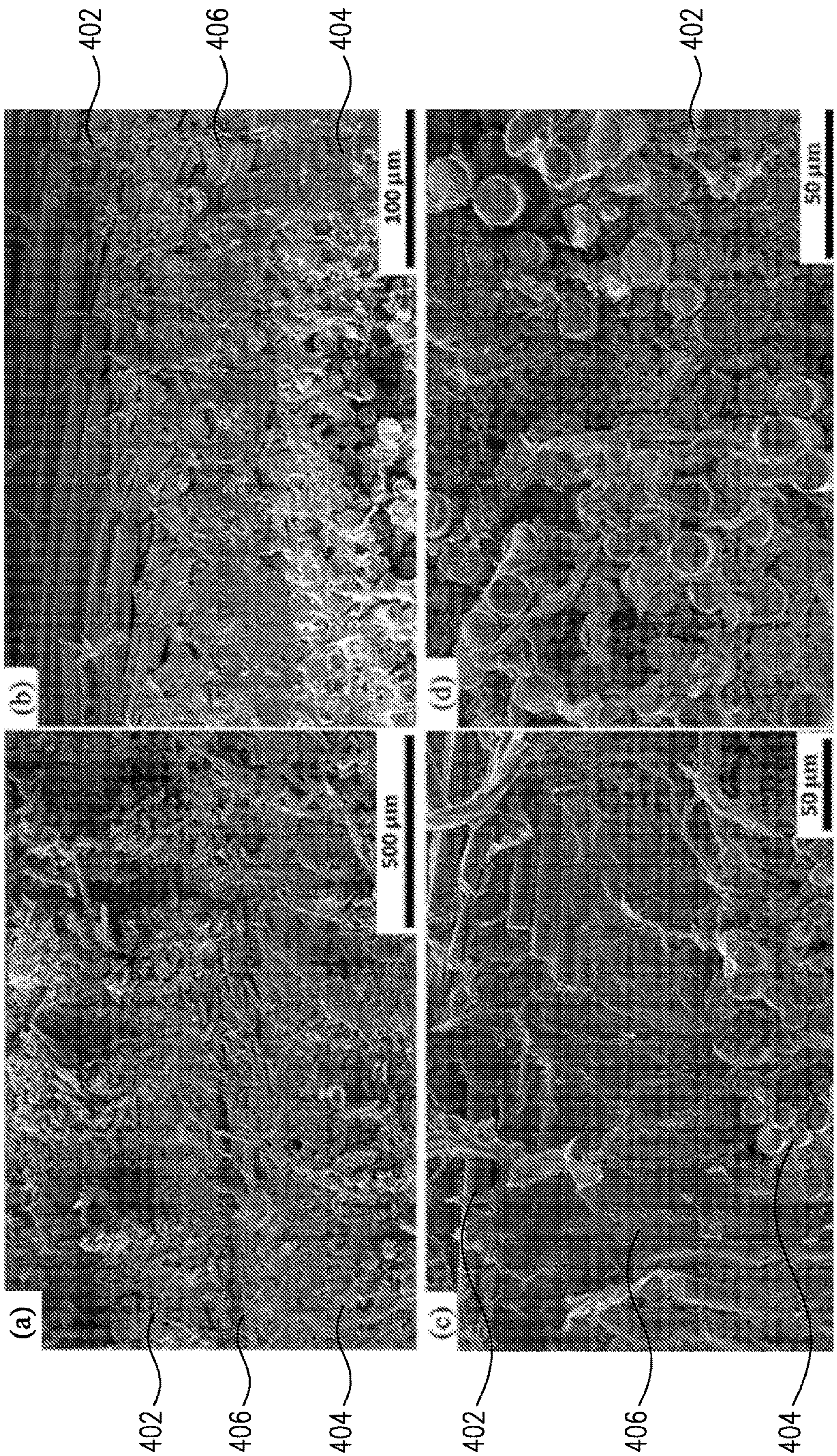
FIG. 6 depicts SEM images of cross-sections of other 3D parts formed by the system depicted in FIG. 1 or 2 and/or the process depicted in FIG. 4.
Figure 7A:
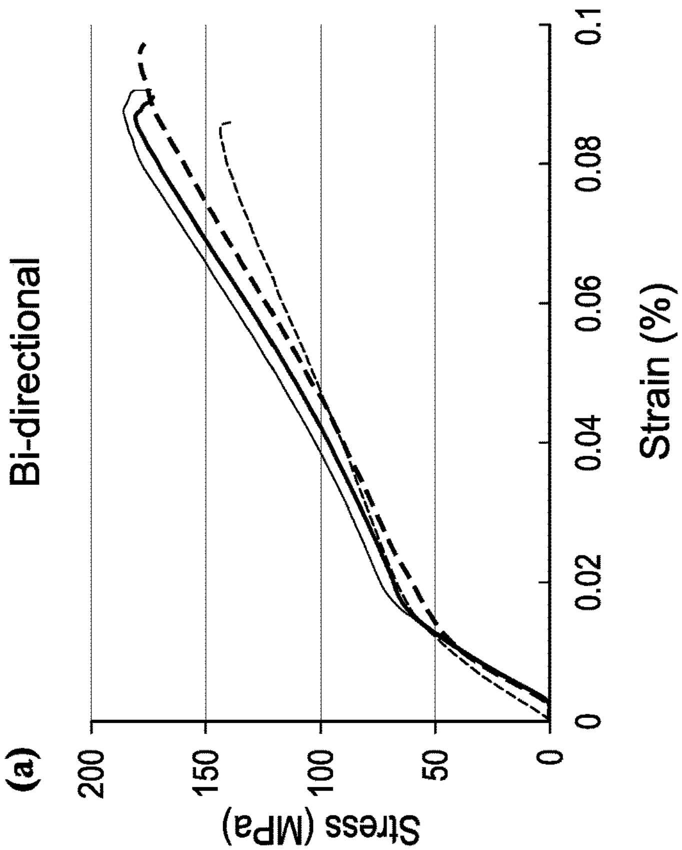
FIGS. 7*a* and 7*b* depicts graphs plotting stress versus strain for 3D parts formed by the system depicted in FIG. 1 or 2 and/or the process depicted in FIG. 4.
Figure 7B:
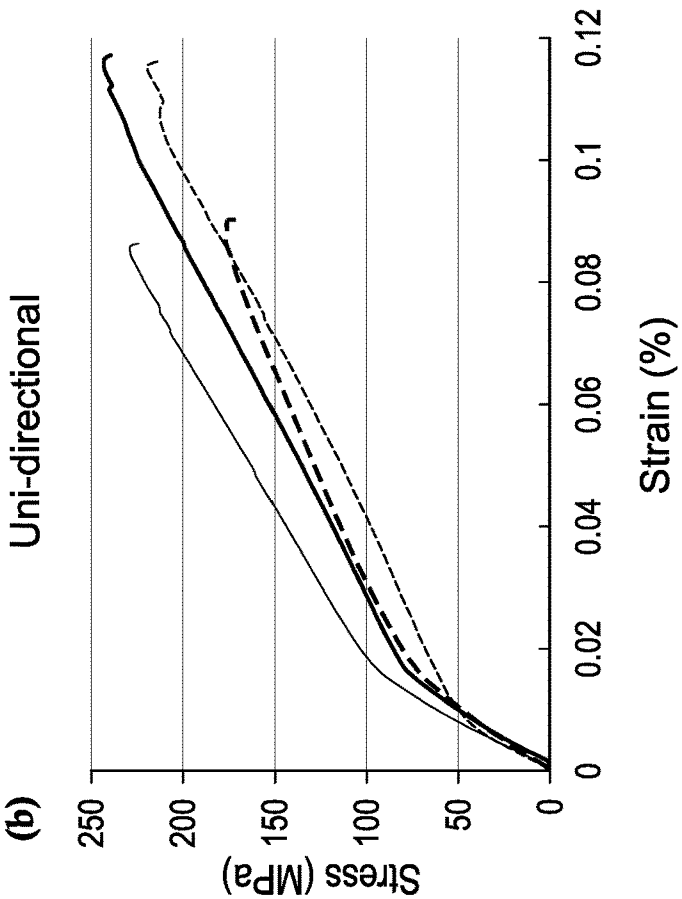

FIG. 6 shows SEM images of a cross-section of a 3D part formed using the above-described system and/or process similar to those shown in FIG. 5, but which depict a cross-section of a 3D part formed using bidirectional glass fiber/prepreg such as, e.g., IE 6010 commercially available from Polystrand®. The tapes in each layer were again laid at a substantially 90-degree angle with respect to the abutting layers. Again, and as best seen in FIG. 6(*c*), the above-described process results in no visible void or gaps between the tapes, thus providing a continuous interfacial bond 406 between the abutting layers 402, 404.

Figure 8:
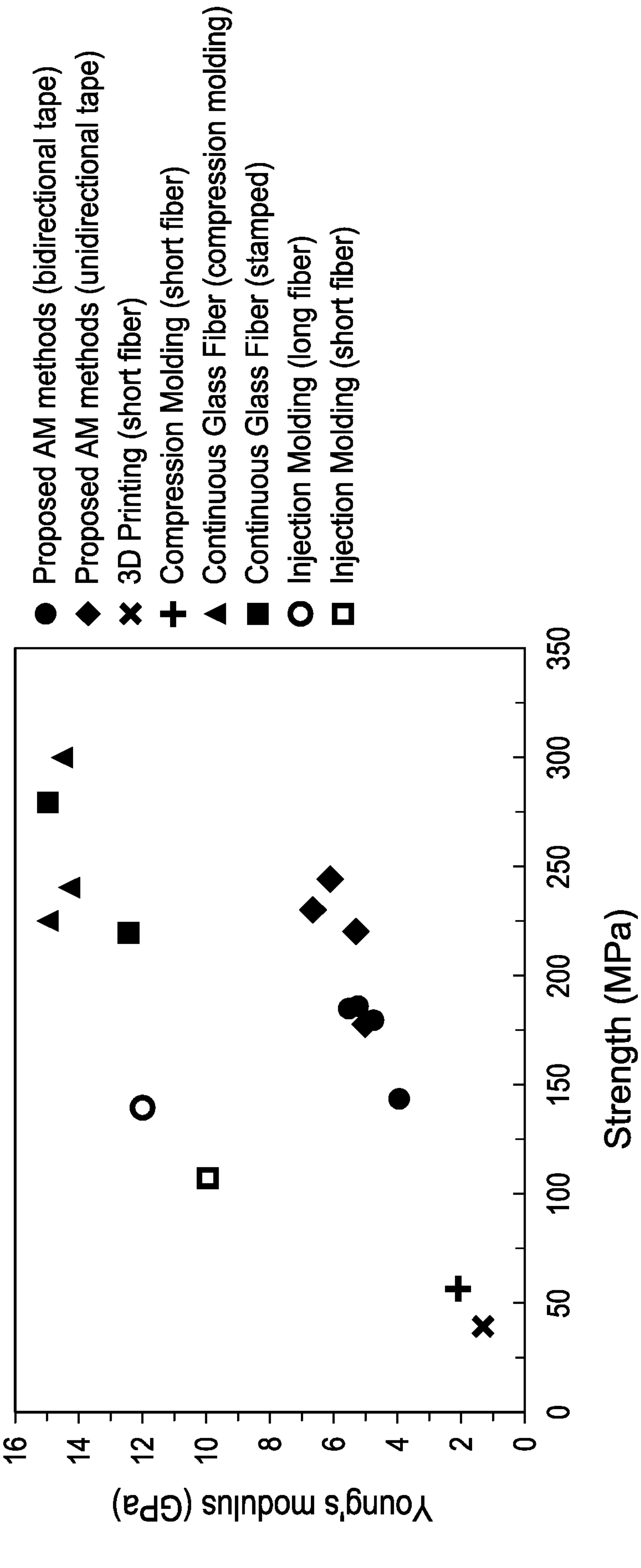
FIG. 8 is a graph plotting Young's modulus versus strength for 3D parts formed by various manufacturing methods including the process depicted in FIG. 4.
Figure 9:
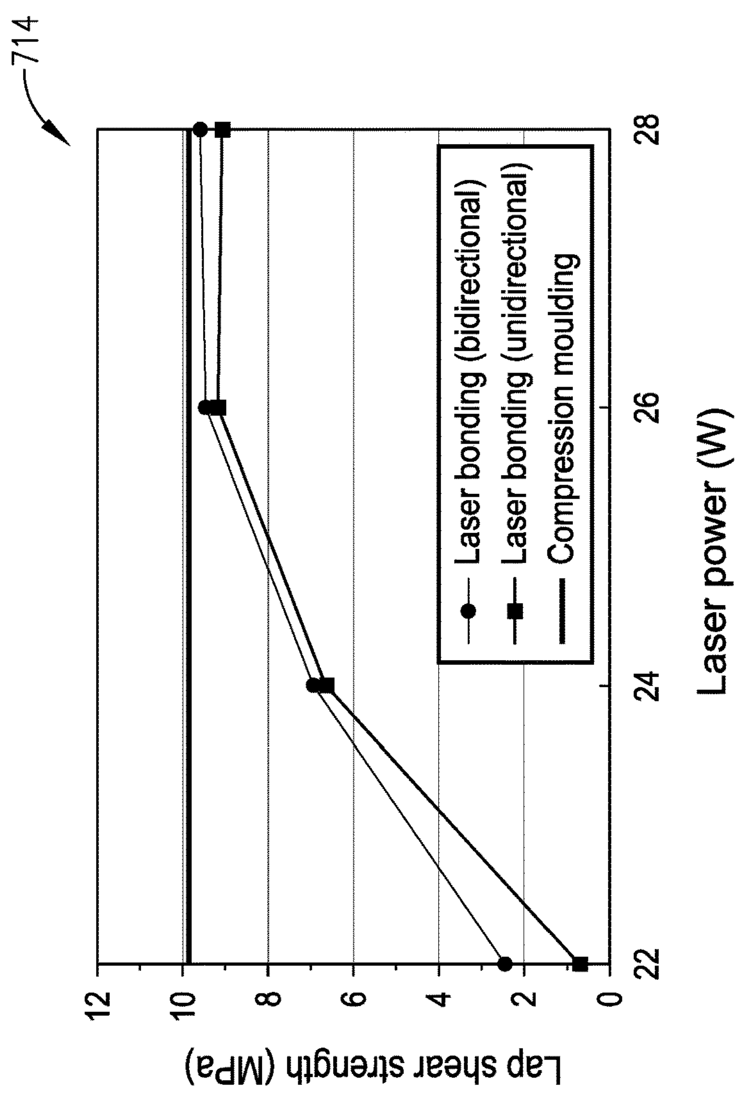
FIG. 9 depicts a graph plotting results of a lap shear strength test for 3D parts formed by the system depicted in FIG. 1 or 2 and/or the process depicted in FIG. 4.

FIG. 9 graphs the results of a tensile test of samples formed from both unidirectional, FIG. 9(*b*), and bidirectional, FIG. 9(*a*), tapes. As compared to other known additive manufacturing methods such as FDM printing of short glass fiber/prepreg, the above-described systems and processes result in substantially better strength and Young's modulus. Moreover, and as seen in FIG. 8, which is a graph depicting the Young's modulus vs. strength for parts formed by various manufacturing methods, the tensile strength of the 3D parts formed by the above-described systems and processes are comparable to traditional methods of composite manufacturing such as compression molding, stamping, and injection molding, but with reduced manufacturing time and/or without the need for post-processing required by each of these traditional methods.

Figure 10:
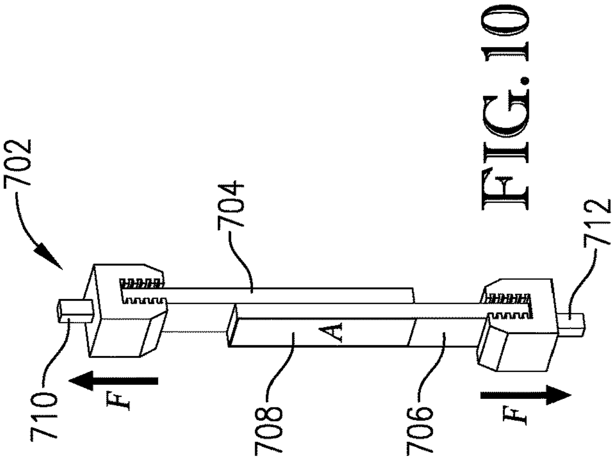
FIG. 10 depicts a lap shear strength test machine for testing samples of 3D parts formed by the systems depicted in FIG. 1 or 2 and/or the process depicted in FIG. 4.

FIG. 10 depicts a testing machine 702 used to perform a lap shear strength test of samples of 3D parts formed using the above-described systems and processes, and a graph 714 depicting the lap shear strength test results. Lap shear strength is one of the most commonly used test methods for investigating bond strength, which involves axial pulling of the bonded specimen. Namely, the machine 702 clamps a first test piece 704 in a first clamp 710 and a second test piece 706 in a second clamp 712. The test pieces 704, 706 are bound (i.e., laser welded in the manner described above) at section 708 having a surface area, A. A gradually increasing force, F, is applied to the clamps 710, 712, such that the samples are deformed (elongated) at a constant rate (i.e., "cross-head speed") until failure; i.e., until the test pieces 704, 706 disengage from one another or until at least one of the test pieces 704, 706 breaks. For the embodiment discussed below in connection with graph 714, the cross-head speed was set at 1.3 mm/min as suggested by ASTM D 1002 standard.

The graph 714 depicts the results of lap shear strength test as a plot of lap shear strength vs. laser power for both a unidirectional and bidirectional sample. The graph further depicts the known lap shear strength for a conventional manufacturing technique; i.e., compression molding. The lap shear strength is calculated as a maximum tensile force divided by the area of overlap ($F_{max}/A$), which is represented in MPa. For the results depicted, the tape feed rate was fixed at 2 mm/s. The graph 714 shows that the bond of the 3D parts manufactured using the above-described systems and process have comparable strength to that of the prepreg tape itself and 3D continuous-fiber composites formed using traditional manufacturing methods. For example, as seen from the results of the lap shear strength test for samples using higher laser power (e.g., 26 W and 28 W), the additive manufacturing method described above achieved comparable lap shear strength to compression molding. Namely, when welded using a laser operated at 28 W, the bidirectional sample reached 96% of the lap shear strength achieved by compression molding. And when welded using a laser at 26 W, the unidirectional sample reached 93% of the lap shear strength achieved by compression molding.

Figure 11:
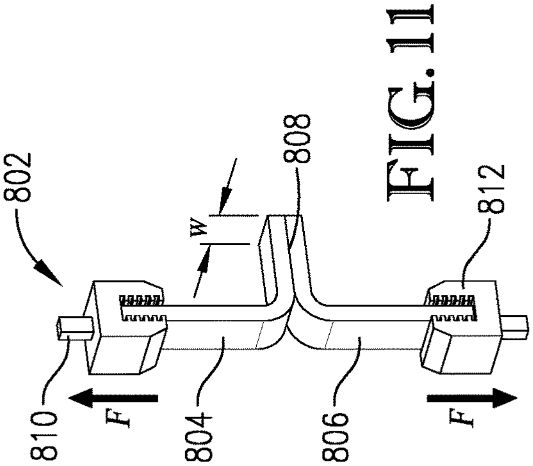
FIG. 11 depicts a T-peel test machine for testing samples of 3D parts formed by the system depicted in FIG. 1 or 2 and/or the process depicted in FIG. 4.

FIG. 11 depicts a testing machine 802 used to conduct a T-peel test (90 degrees) of samples of 3D parts formed using the above-described systems and process. FIGS. 9 and 10 depict graphs 902 and 1002 showing the T-peel test results for a unidirectional and bidirectional specimen, respectively, which are a good indicator of the printed composites' interfacial properties. With respect to FIG. 11, the machine 802 clamps a first test piece 804 in a first clamp 810 and a second test piece 806 in a second clamp 812. The test pieces 804, 806 are bound (i.e., laser welded in the manner described above, using a binding velocity of 2 mm/s and four different power settings: 22 W, 24 W, 26 W, and 28 W) at section 808. A force, F, is then applied to the clamps 810, 812, such that the samples 804, 806 are peeled away from one another (i.e., such that the bond at section 808 is overcome) at a rate of, for the below-discussed graphs 902 and 1002, 5 mm/s. As seen, the machine is a 90-degree peel-test machine, meaning the force, F, is generally applied at an angle of 90 degrees with respect to a plane comprising the bonded section 808. During the test, the samples 804, 806 are peeled apart for a length of approximately 70 mm.

Figure 12:
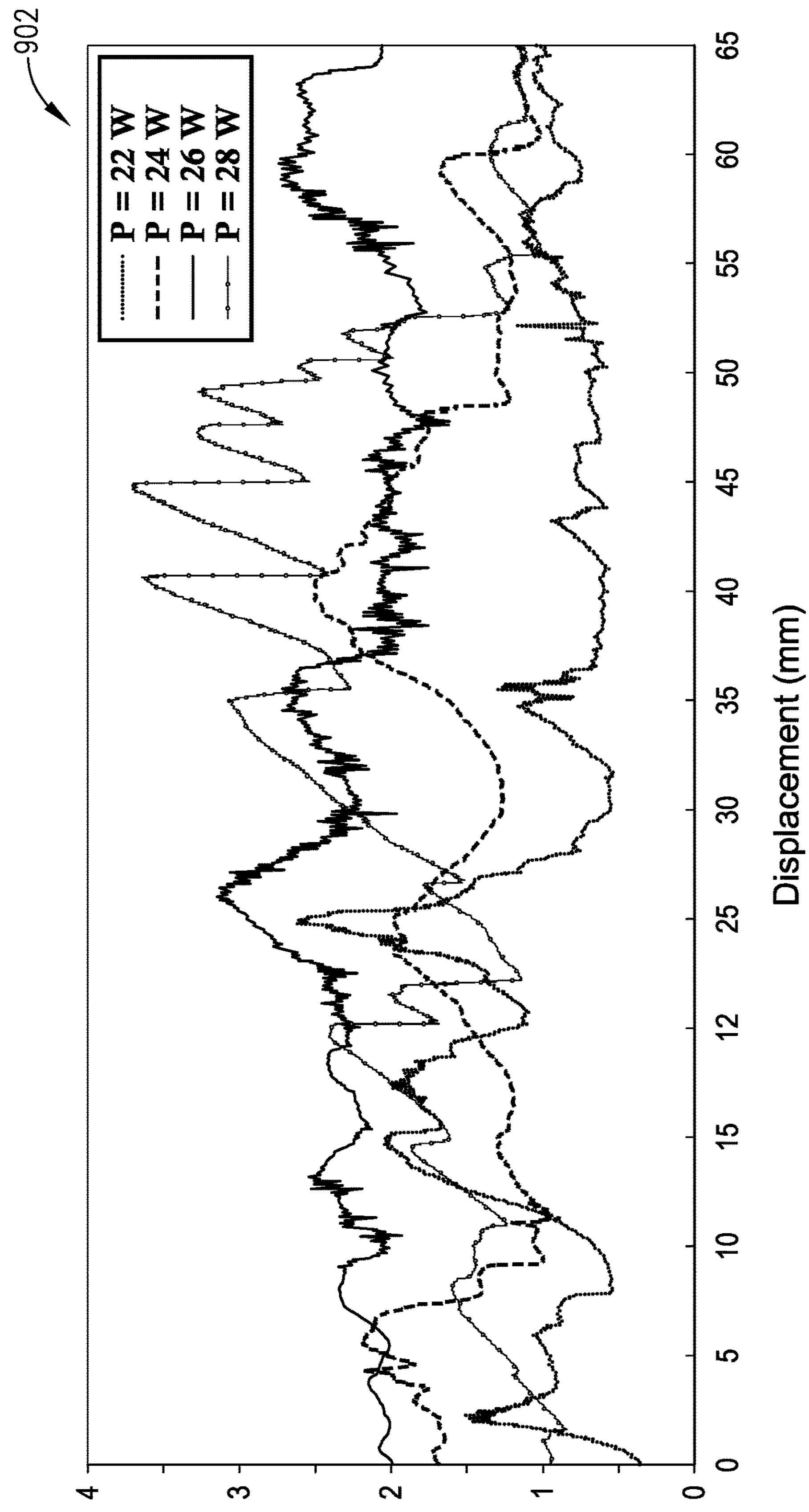
FIGS. 12 and 13 depict graphs plotting the results of T-peel tests performed using the T-peel test machine depicted in FIG. 11.
Figure 13:
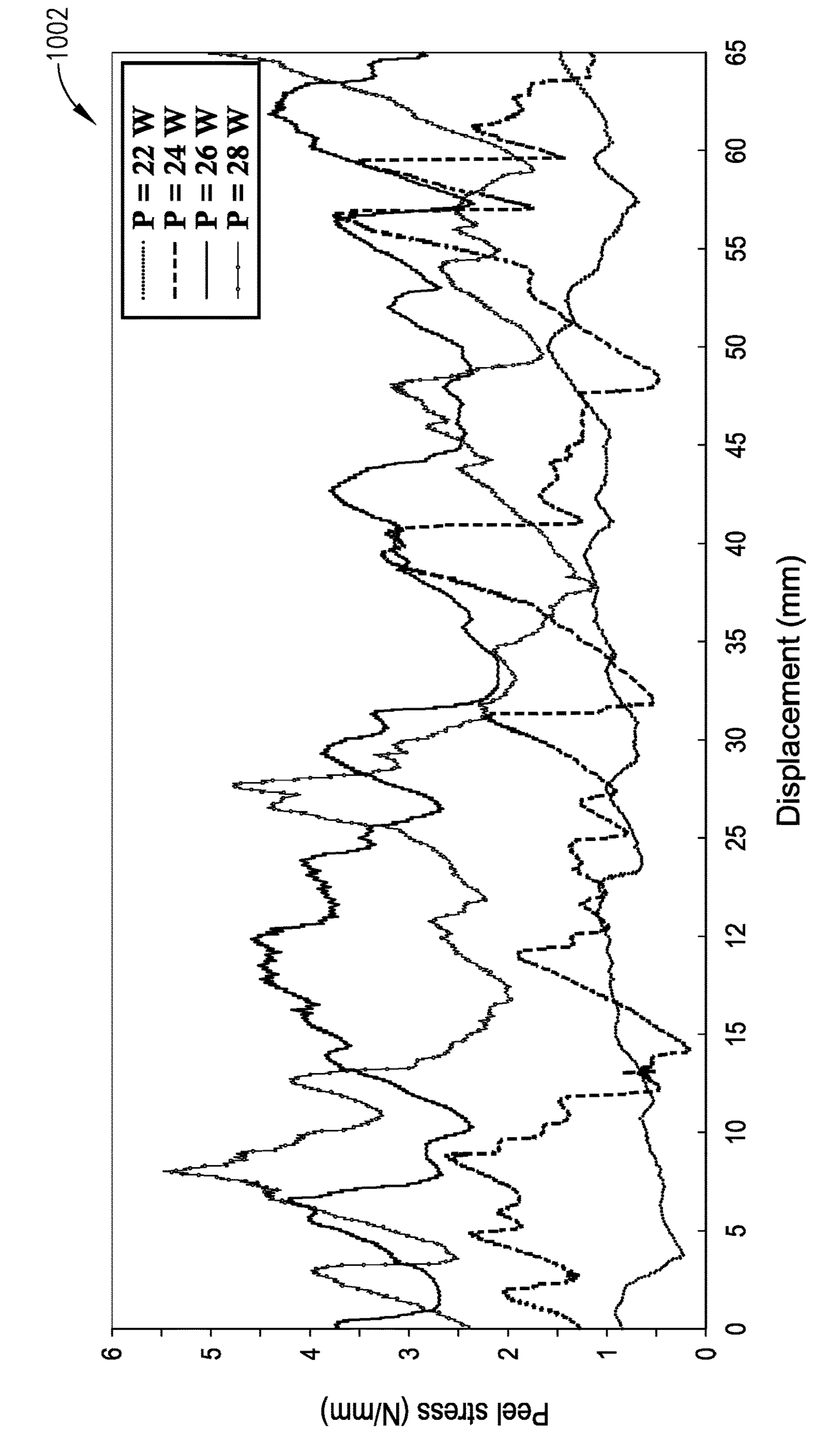

Graph 902 in FIG. 12 graphically depicts the results of the T-peel test as stress (N/mm) vs. displacement (mm) for a unidirectional sample, while graph 1002 in FIG. 13 depicts the results of the T-peel test as stress (N/mm) vs. displacement (mm) for a bidirectional sample. As seen, although the bidirectional tape achieved greater peel strength relative to the unidirectional tape, both types of composite materials exhibited bonds with comparable strength to that of the prepreg tape itself and 3D continuous-fiber composites formed using traditional manufacturing methods. Moreover, as can be seen from the different plots in each graph 902, 1002, the ultimate peel strength can be varied by adjusting the power of the laser used during the laser-welding step. Namely, as seen, a welding power of 26 W (when the tape is laid at 2 mm/s) overall yielded the best peel strength for both unidirectional and bidirectional specimens.

Figure 14:
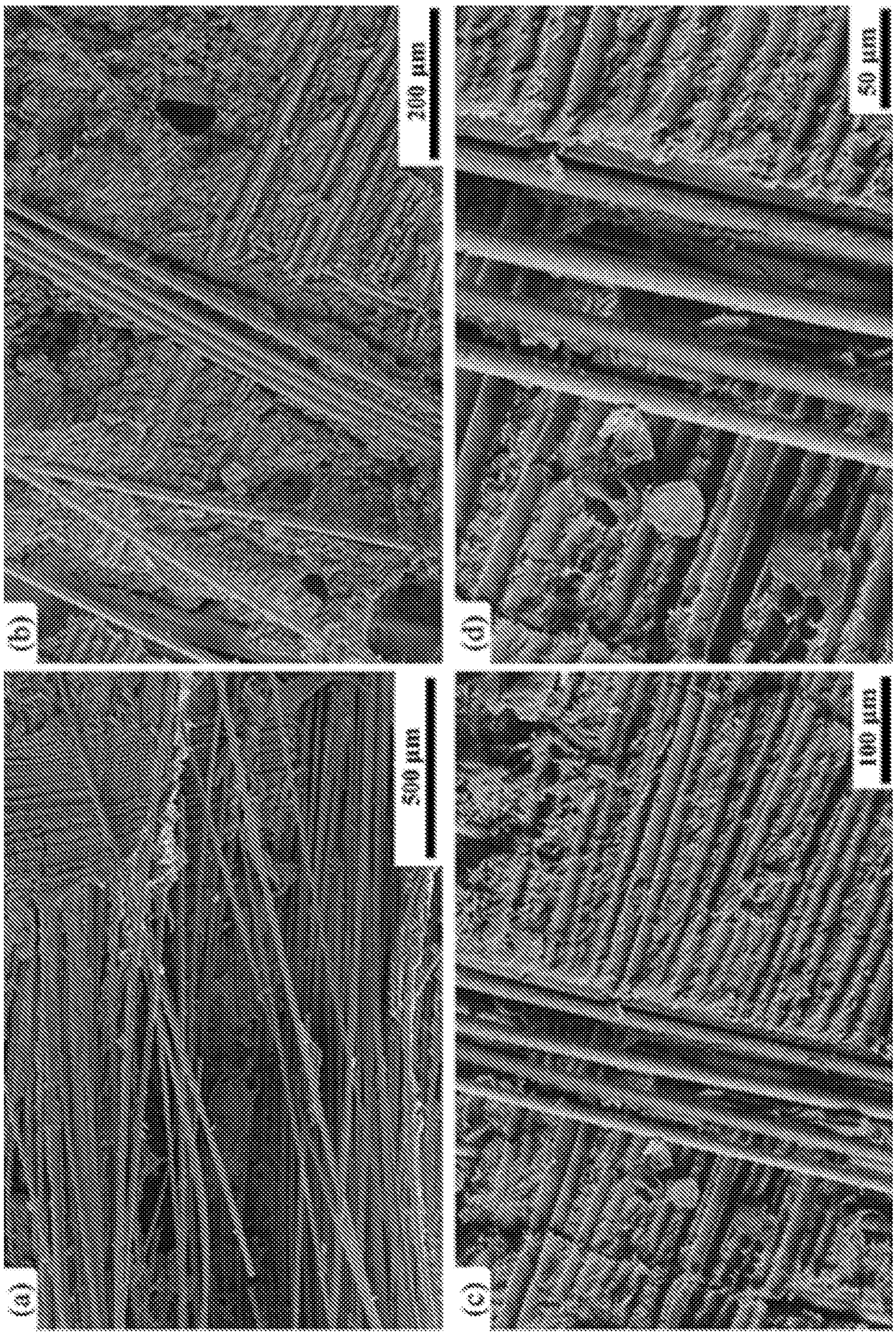
FIG. 14 depicts SEM images of the surface of test samples of 3D parts formed by the system depicted in FIG. 1 or 2 and/or the process depicted in FIG. 4 following the peel test shown in FIG. 12.

FIG. 14 shows SEM images of the surface of test samples following the above-described peel test. As seen in the SEM images, the continuous fibers are damaged and "pulled out" of the samples during the test, demonstrating that above-described method results in exceptional interfacial bonding. This indicates that the above-described systems and processes provide a remarkable bonding strength between two layers of glass-fiber composites, even when compared to traditional manufacturing methods. That is, rather than simply failing at the laser weld, the samples failed within the tape forming the 3D parts.

Figure 15:
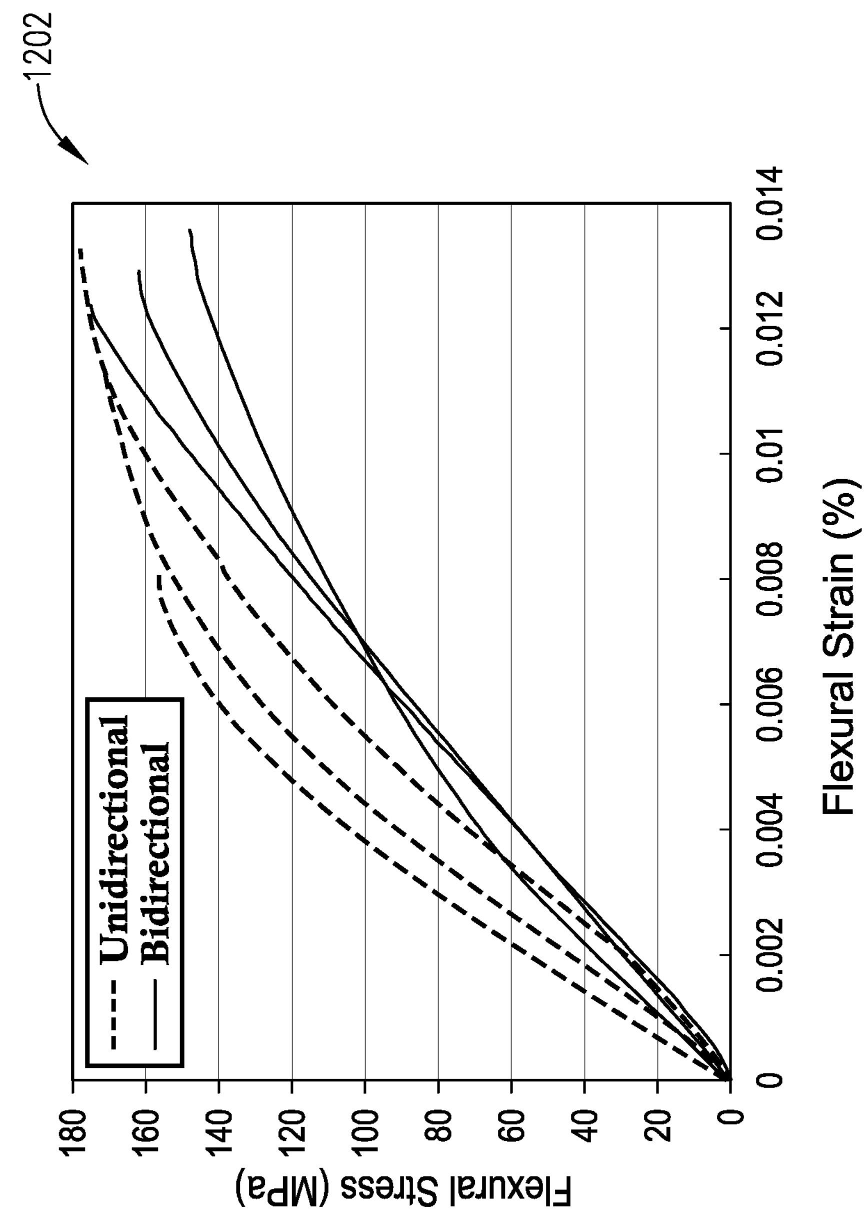
FIG. 15 depicts a graph plotting flexural stress versus flexural strain for 3D parts formed by the system depicted in FIG. 1 or 2 and/or the process depicted in FIG. 4.
Figure 16:
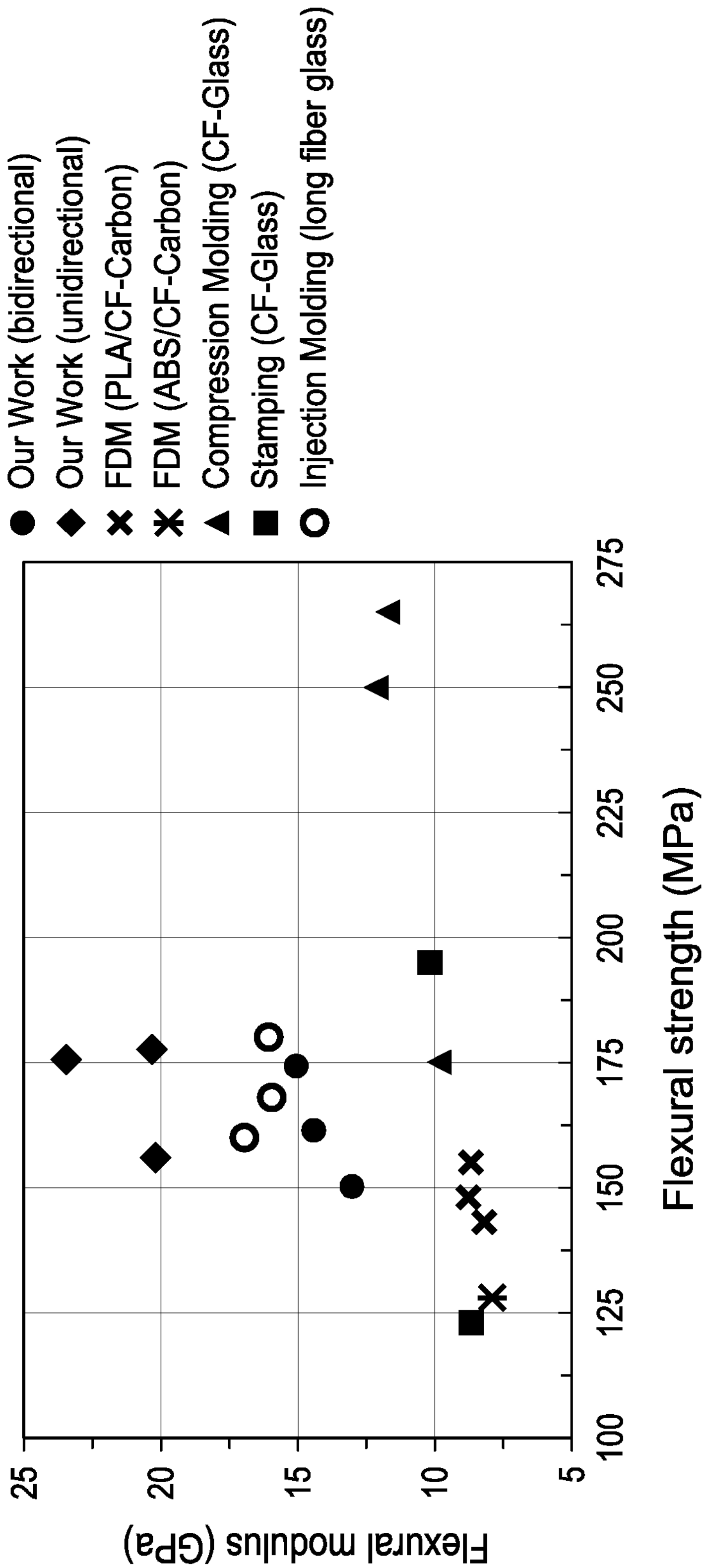
FIG. 16 is a graph plotting flexural modulus versus flexural strength for 3D parts formed by various manufacturing methods including the process depicted in FIG. 4.

Finally, FIGS. 12-13 illustrate the flexural properties of samples of 3D parts formed using the above-described systems and processes. First, FIG. 15 depicts a graph 1202 showing flexural stress versus flexural strain curves for the results of a 3-point bending test. The uppermost three curves represent unidirectional samples, while the lowermost three curves represent bidirectional samples. Moreover, FIG. 16 compares properties—plotted as flexural modulus versus flexural strength—of three samples of both unidirectional samples ("Our work (UD)") and bidirectional samples ("Our work (BD)"), with other manufacturing methods including injection molding using long fiber (LF) materials, stamping using continuous fiber (CF) materials, and compression molding using CF materials. As seen in FIG. 16, samples created using the above-described systems and methods achieved comparable strength to, e.g., samples created using stamping and injection molding techniques, while exhibiting higher flexural modulus than stamping or compression molding. In short, the above-described systems and methods are capable of forming 3D parts having comparable flexural properties as traditional manufacturing methods using continuous fiber reinforced thermoplastic polymers.

Additional advantages of the various embodiments of the invention will be apparent to those skilled in the art upon review of the disclosure herein. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein. Many different arrangements of the various components depicted, as well as components not shown, are possible without departing from the spirit and scope of the present invention. Embodiments of the present invention have been described with the intent to be illustrative rather than restrictive. While the drawings illustrate, and the specification describes, certain preferred embodiments of the invention, it is to be understood that such disclosure is by way of example only. There is no intent to limit the principles of the present invention to the particular disclosed embodiments.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

Further, while the drawings illustrate, and the specification describes, certain preferred embodiments of the invention, it is to be understood that such disclosure is by way of example only. Embodiments of the present invention are described herein with reference to schematic illustrations of idealized embodiments of the present invention. As such, variations from the shapes of the illustrations as a result, for example, of manufacturing techniques and/or tolerances, are to be expected. There is no intent to limit the principles of the present invention to the particular disclosed embodiments. For example, in the drawings, the size and relative sizes of layers and regions may be exaggerated for clarity. In addition, embodiments of the present invention should not be construed as limited to the particular shapes of regions illustrated herein but are to include deviations in shapes that result, for example, from manufacturing. For ease of description, terms of direction such as "upwards," "lower," "bottom," "top," etc., may be used to describe the relative position of certain structures. Such descriptions should not be taken as limiting on the invention unless otherwise noted.

We claim:

1. An additive manufacturing method for constructing a three-dimensional part from a continuous-fiber reinforced tape, the method comprising:

forming a laminate structure comprising the steps of:

(a) forming a base layer out of one or more segments of continuous-fiber reinforced tape, wherein each of the one or more segments of continuous-fiber reinforced tape comprises a fiber and thermoplastic material composite, and wherein each of the one or more segments of continuous-fiber reinforced tape includes two opposed major faces and two opposed minor faces, each of the minor faces extending between the two opposed major faces;

(b) welding a first layer comprising one or more segments of the continuous-fiber reinforced tape to the base layer, wherein the welding of the first layer to the base layer comprises causing the thermoplastic material of a first major face of the one or more segments of continuous-fiber reinforced tape of the base layer to heat and intermix with the thermoplastic material of a first major face of the one or more segments of the continuous-fiber reinforced tape of the first layer so as to form a bond between the one or more segments of continuous-fiber reinforced tape of the base layer and the one or more segments of continuous-fiber reinforced tape of the first layer that occupies at least a majority of the first major face of each of the one or more segments of continuous-fiber reinforced tape of the base and first layers;

(c) cutting a first predetermined shape in the first layer corresponding to a cross-section of the part being manufactured;

(d) welding a second layer comprising one or more segments of the continuous-fiber reinforced tape to the first layer having the first predetermined shape, wherein the welding of the second layer to the first layer comprises causing the thermoplastic material of a second major face of the one or more segments of continuous fiber reinforced tape of the first layer to heat and intermix with the thermoplastic material of a first major face of the one or more segments of continuous-fiber reinforced tape of the second layer so as to form a bond between the one or more segments of continuous-fiber reinforced tape of the first layer and the one or more segments of continuous-fiber reinforced tape of the second layer that occupies at least a majority of the second major face of the one or more segments of continuous-fiber reinforced tape of the first layer and at least a majority of the first major face of the one or more segments of continuous-fiber reinforced tape of the second layer; and (e) cutting a second predetermined shape in the second layer corresponding to a cross-section of the part being manufactured, wherein the laminate structure has a tensile strength that is at least a great as each of the segments of continuous-fiber reinforced tape, wherein a laser is used to perform at least one of welding steps (b) and (d) and cutting steps (c) and (e), and wherein the one or more segments of continuous-fiber reinforced tape of one or more of the base layer, the first layer, and the second layer further comprise a plurality of adjacent segments of the continuous-fiber reinforced tape, whereby minor faces of adjacent ones of the plurality of adjacent segments are welded together by causing the thermoplastic material of a respective minor face of one of the adjacent segments to heat and intermix with the thermoplastic material of a respective minor face of another of the adjacent segments so as to form a bond between the adjacent segments.

2. The method of claim 1, further comprising compacting the segments of continuous-fiber reinforced tape of the base layer, the first layer, and the second layer.

3. The method of claim 2, wherein the compacting is performed using a roller.

4. The method of claim 3, wherein the compacting is performed by rolling the roller such that it moves in a lateral direction at a predetermined binding velocity.

5. The method of claim 1, wherein the welding is performed using the laser.

6. The method of claim 5, wherein the laser is a carbon dioxide laser.

7. The method of claim 6, wherein the welding is performed by operating the carbon dioxide laser at a power between 15 W and 35 W.

8. The method of claim 1, wherein the welding is performed by ultrasonic welding.

9. The method of claim 1, wherein cutting the first predetermined shape in the first layer includes using the laser to cut the first predetermined shape.

10. The method of claim 9, further comprising using at least one movable mirror to direct the laser during the cutting.

11. The method of claim 9, wherein cutting the first predetermined shape further comprises focusing the laser to a spot diameter between 0.5 mm and 1.5 mm.

12. The method of claim 1, wherein each of the first and second layers comprise the plurality of adjacent segments of the continuous-fiber reinforced tape;

wherein the welding of the first layer to the base layer causes the thermoplastic material of a second minor face of a first segment of continuous-fiber reinforced tape of the first layer to heat and intermix with the thermoplastic material of a first minor face of a second segment of continuous-fiber reinforced tape of the first layer so as to form a bond between the first and second segments of continuous-fiber reinforced tape of the first layer that occupies at least a majority of the second minor face of the first segment of continuous-fiber reinforced tape of the first layer; and wherein the welding of the second layer to the first layer causes the thermoplastic material of a second minor face of a first segment of continuous-fiber reinforced tape of the second layer to heat and intermix with the thermoplastic material of a first minor face of a second segment of continuous-fiber reinforced tape of the second layer so as to form a bond between the first and second segments of continuous-fiber reinforced tape of the second layer that occupies at least a majority of the second face of the first segment of continuous-fiber reinforced tape of the second layer.

13. The method of claim 12, wherein a longest dimension of fibers within the first layer is substantially perpendicular to a longest dimension of fibers within the second layer.

14. The method of claim 1, wherein both of the welding steps (b) and (d) and both of the cutting steps (c) and (e) are performed using the laser.

* * * * *